J. QUIGLEY & O. N. BECK.
BEER TAP.
APPLICATION FILED MAR. 18, 1910.
963,323.
Patented July 5, 1910.
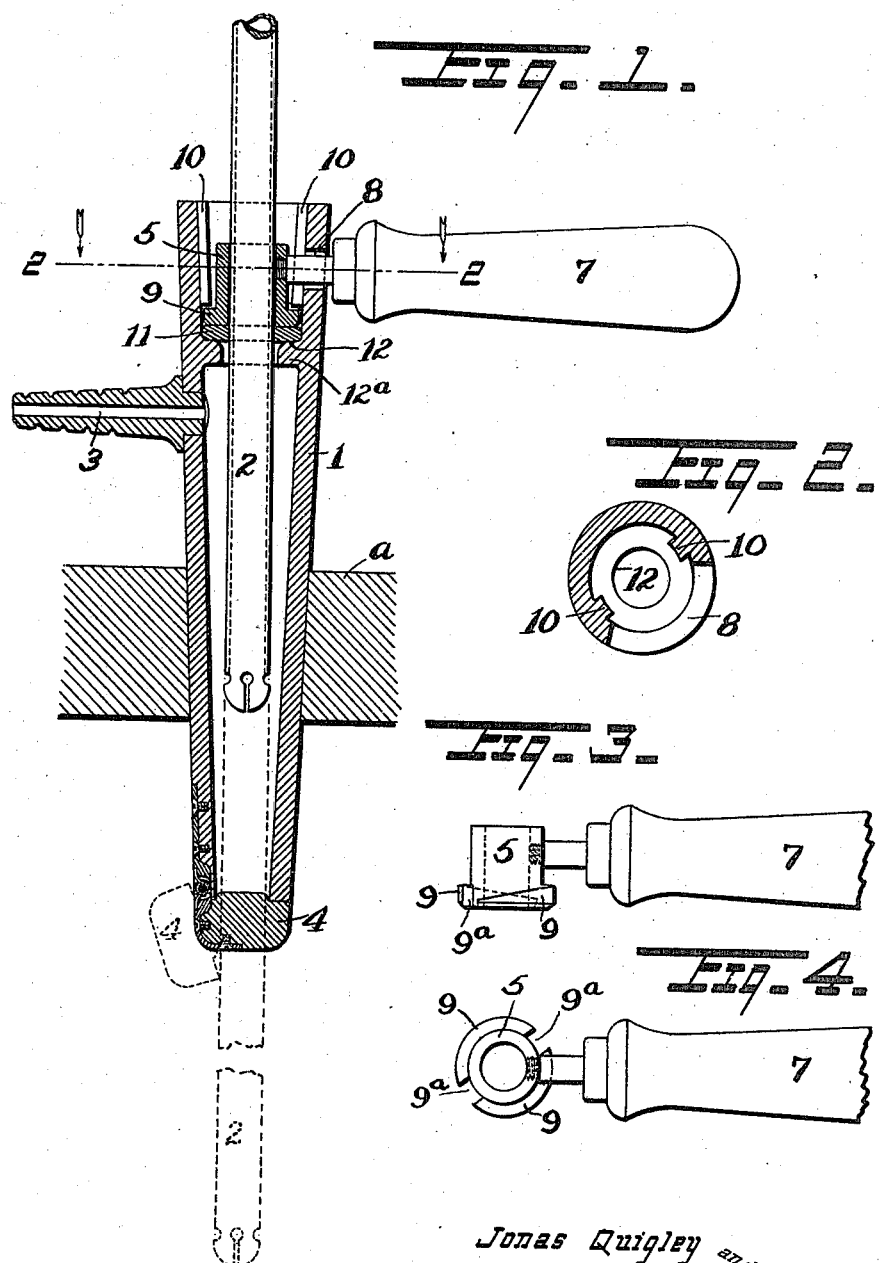

UNITED STATES PATENT OFFICE.

JONAS QUIGLEY AND OLIVER N. BECK, OF BALLY, PENNSYLVANIA.

BEER-TAP.

963,323.   Specification of Letters Patent.   Patented July 5, 1910.

Application filed March 18, 1910. Serial No. 550,189.

*To all whom it may concern:*

Be it known that we, JONAS QUIGLEY and OLIVER N. BECK, both citizens of the United States, and residents of Bally, in the county of Berks and State of Pennsylvania, have invented certain new and useful Improvements in Beer-Taps, of which the following is a specification.

Our invention relates particularly to beer tapping means in which a tap-tube is employed in connection with a casing therefor through which air-pressure is transmitted to the liquid; and our object is to provide an improved device of very simple construction and operation, as fully described in connection with the accompanying drawing, and the novelty of which is specifically pointed out in the claim.

Figure 1 is a sectional elevation showing our complete device as applied to a beer keg or the like; the end portion of the tap-tubing being shown in inoperative position within the casing, but being indicated by dotted lines as projected through the bottom of the casing so as to communicate with the liquid in the vessel. Fig. 2 is a cross-sectional view of the casing on the line 2—2 of Fig. 1. Figs. 3 and 4 show separately the rotary cam-sleeve and its operating handle.

The tap-tube 2, which is of ordinary form, is adjustably mounted in a tubular casing 1, which is tapered to fit directly in the aperture of the keg-wall $a$ as shown. The inner end of said casing is normally closed by a valve 4, hinged thereto as indicated so as to be forced open by the pushing in of the tap-tube to its operative (dotted lines) position after the casing has been tightly driven into the keg aperture. An air-pressure inlet 3 to the casing, located intermediately thereof, serves to provide the feed pressure upon the liquid as usual.

The mounting of the tap-tube 2 in the casing 1 so as to enable it to be easily and satisfactorily secured in operative or inoperative position, is provided for in a very simple and economical manner by forming directly upon the interior wall of the casing 1 and adjacent the upper end thereof, first, a collar $12^a$ loosely surrounding the inserted tap-tube 2 above the air inlet 3 and with an annular packing-seat 12; and second, longitudinal ribs or projections 10, 10 above said seat 12; while a slot 8 is formed in the wall of the casing, extending circularly between said projections 10, 10 in a plane above said seat 12, so that a packing washer 11, placed upon the latter may be quickly compressed or loosened by means hereafter described, so as to either tightly engage or to release the tap-tube 2. The means referred to comprises a rotary cam-sleeve 5 which is introduced into the casing through the open upper end thereof; said sleeve being formed with wedge-like flanges 9, 9 adapted to engage the lower ends of the rib-projections 10, 10 when the sleeve is rotated, said flanges being separated so as to provide passage ways $9^a$ to enable the sleeve to be passed into the end of the casing to the position indicated. After being thus inserted so as to rest upon the previously inserted packing washer 11, the cam-sleeve 5 is provided with an operating handle 7 by passing the shank of the latter through the wall-slot 8 and screwing it into engagement with the sleeve; so that the latter may then be turned, as permitted by the length of said slot, sufficiently to quickly compress or loosen the washer. After the device has been tightly driven into the keg aperture as shown in Fig. 1, and the tap-tube lowered into the keg as indicated by the dotted lines, a slight movement of the handle 7 will serve to clamp and tightly pack it, and it may be loosened in like manner.

What we claim is:—

The combination with a tap-tube, of a taper-tube casing therefor provided with a valve at its inner end, with an interior annular packing-seat 12, interior projections 10, and a circular wall-slot 8 adjacent its outer end, and with an intermediate air-pressure inlet; a packing washer and a rotary cam-sleeve located between said seat and projections; and a removable operating handle for said cam-sleeve projecting through said wall-slot, substantially as set forth.

In testimony whereof, we affix our signatures, in the presence of two witnesses.

JONAS QUIGLEY.
OLIVER N. BECK.

Witnesses:
S. JAIRUS KUTZ,
WILLIAM SCHEIRY.